United States Patent
Käppi (10) Patent No.: US 12,480,766 B2
(45) Date of Patent: Nov. 25, 2025

(54) METHOD AND APPARATUS FOR RELIANCE UPON CENTRIPETAL ACCELERATION TO MITIGATE ERROR IN AN INERTIAL NAVIGATION SYSTEM

(71) Applicant: HERE Global B.V., Eindhoven (NL)

(72) Inventor: Jani Käppi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 226 days.

(21) Appl. No.: 17/937,855

(22) Filed: Oct. 4, 2022

(65) Prior Publication Data

US 2024/0110792 A1  Apr. 4, 2024

(51) Int. Cl.
*G01C 21/16* (2006.01)

(52) U.S. Cl.
CPC ......... *G01C 21/183* (2020.08); *G01C 21/165* (2013.01)

(58) Field of Classification Search
CPC .............................. G01C 21/165; G01C 21/183
See application file for complete search history.

(56) References Cited

U.S. PATENT DOCUMENTS

| | | | |
|---|---|---|---|
| 8,543,266 B2 * | 9/2013 | Li | B64G 1/244 701/472 |
| 8,843,290 B2 | 9/2014 | Kulik et al. | |
| 9,704,049 B2 | 7/2017 | Peterson et al. | |
| 10,948,299 B1 * | 3/2021 | Zhang | G01C 21/1656 |
| 2008/0071476 A1 | 3/2008 | Hoshizaki | |
| 2017/0069144 A1 * | 3/2017 | Lawrie-Fussey | G07C 5/085 |
| 2020/0250837 A1 * | 8/2020 | Fagg | G06F 18/253 |
| 2021/0215484 A1 * | 7/2021 | Keyes | G01C 25/005 |
| 2021/0325544 A1 * | 10/2021 | Bageshwar | G01S 19/52 |

FOREIGN PATENT DOCUMENTS

CN  108773378 A  11/2018

OTHER PUBLICATIONS

Han et al., "SenSpeed: Sensing Driving Conditions to Estimate Vehicle Speed in Urban Environments", IEEE Infocom 2014—IEEE Conference on Computer Communications, (Jul. 8, 2014), 9 pages.

U.S. Appl. No. 17/657,218, filed on Mar. 30, 2022, In re: Jani Käppi, entitled, "Method and Apparatus for Recovering Frame Orientation Between Body and Vehicle Frames for an Inertial Navigation System", 41 pages.

* cited by examiner

*Primary Examiner* — Andrea C Leggett (57) ABSTRACT

A method, apparatus and computer program product provide for error mitigation in an inertial navigation system (INS) based upon centripetal acceleration experienced by a vehicle that carries the INS. In the context of a method, the centripetal acceleration experienced by a vehicle carrying the INS that is making a turn is determined. The method also includes determining a velocity of the vehicle in reliance upon the centripetal acceleration. Based on the velocity determined in reliance upon the centripetal acceleration, the method further includes updating one or more filters of the INS to correct a velocity estimate provided by the INS.

17 Claims, 5 Drawing Sheets

Prior Art

Figure 1A

Prior Art

METHOD AND APPARATUS FOR RELIANCE UPON CENTRIPETAL ACCELERATION TO MITIGATE ERROR IN AN INERTIAL NAVIGATION SYSTEM

TECHNOLOGICAL FIELD

An example embodiment relates generally to a technique for error mitigation in an inertial navigation system and, more particularly, to a method, apparatus and computer program product that relies upon centripetal acceleration to mitigate error in an inertial navigation system.

BACKGROUND

In order to determine its position, some vehicles or other systems rely upon an inertial navigation system (INS). The INS is carried by the vehicle or other system and utilizes dead reckoning to determine the current position of the vehicle or other system based upon a prior position of the vehicle or other system in combination with motion data of the vehicle or other system. The prior position of the vehicle or other system may have been previously determined utilizing a reference system, such as, a satellite-based positioning technique, e.g., a Global Navigation Satellite System (GNSS)-based positioning technique. The INS may also include an inertial measurement unit (IMU) that determines the motion data defining the movement of the vehicle or other system from the point in time at which the prior position was previously determined to a subsequent point in time at which the current position of the vehicle or other system is determined by utilizing dead reckoning.

In operation, the INS processes the measurements provided by the IMU and calculates, utilizing equations of motion, the vehicle states in the navigation frame defined by movement by the vehicle or other system. The INS includes one or more filters to estimate the system errors and provides feedback to cancel or reduce the effect of the errors. The performance of the filters is defined by filter parameters which, in turn, are updated by the observations provided by the reference system. In an instance in which the INS is carried by a ground vehicle, the filters can also estimate the vehicle frame orientation with respect to the navigation and body frames. This estimation further assists with the positioning performance, particularly in an instance in which the sensors of the INS which define the body frame are able to move or rotate with respect to the vehicle.

The primary error source for an INS is sensor bias, which is the steady state sensor offset with zero signal input. However, the performance of an INS is also impacted by other types of sensor errors, which must be modeled on a case-by-case basis as the other types of sensor errors are use-case dependent. For example, in high dynamic environments, the contribution of cross axis errors or g-sensitivity begins to adversely impact INS performance more significantly and may need to be included into the characterization and modelling of the sensors. Additionally, the motion sensors behave differently depending on the quality and construction of each sensor such that the operating environment may need to be considered to determine its impact upon the manner in which the sensors react to motion input, such as in the form of sensor noise contribution changes. Thus, the implementation of an INS system using sensors carried by a mobile device may be significantly different than other types of INS systems.

Figure 1A:
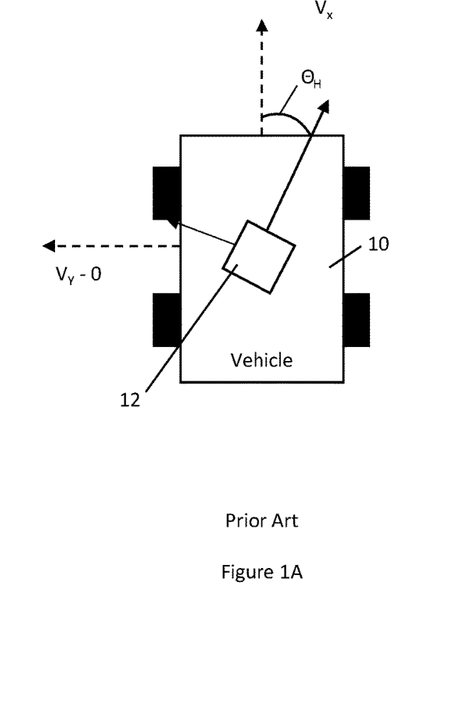
FIGS. 1A and 1B illustrate the misalignment of a body frame defined by a mobile device, such as a mobile device containing one or more sensors of an inertial measurement unit (IMU), to a vehicle frame defined by a vehicle and the application of the non-holonomic constraints.
Figure 1B:
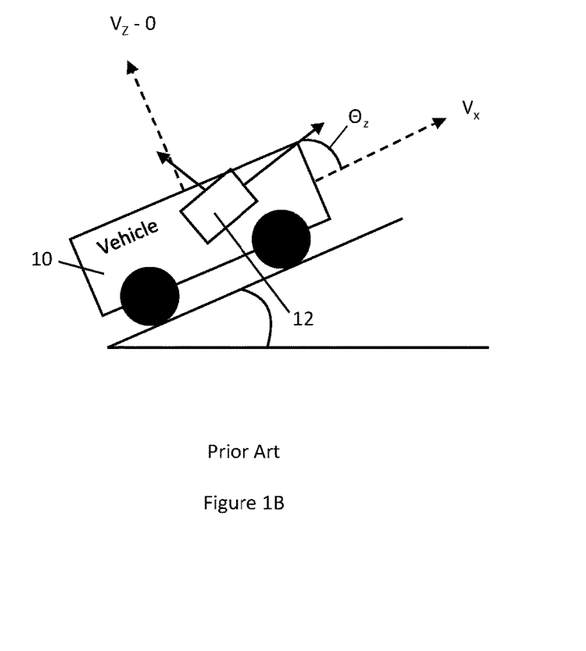

In order to improve the positioning performance of an INS in a dead-reckoning mode, the INS may apply non-holonomic constraints. By way of explanation, reference is made to FIGS. 1A and 1B in which an inertial measurement unit (IMU) 12, such as an IMU embodied by a mobile device, such as a personal digital assistant (PDA), mobile telephone, smart phone, personal navigation device, smart watch, tablet computer, or the like, may be carried by a vehicle 10 and, as a result, may generally move in concert with the vehicle. The vehicle may be any of a wide variety of vehicles including, for example, an automobile, a truck, a scooter, or any other type of terrestrial vehicle. As also shown in FIGS. 1A and 1B, the body frame defined by the mobile device that embodies the IMU may be misaligned relative to the vehicle frame, such as by being misaligned in the horizontal XY plane as indicated in FIG. 1A by angle $\Theta_H$ and by being misaligned in the vertical XZ plane as indicated in FIG. 1B by the angle $\Theta_Z$.

As a result of the movement of the vehicle along a road or other surface, the velocity of the vehicle in its direction of travel may be defined to be $V_x$. Since the vehicle is unlikely to move, at least in any appreciable amount, in a lateral direction or in a vertical direction, non-holonomic constraints may be applied such that the velocity $V_y$ in the lateral direction and the velocity $V_z$ in the vertical direction can be set equal to 0 or substantially equal to 0. By applying the non-holonomic constraints, the accuracy with which the position of the vehicle is determined by the INS may be enhanced. However, even with the improvements in positioning performance brought about by the application of non-holonomic constraints, the performance of an INS may degrade over time as a result the sensor bias and other sensors errors.

BRIEF SUMMARY

A method, apparatus and computer program product are provided in accordance with an example embodiment in order to provide for error mitigation in an inertial navigation system (INS) based upon centripetal acceleration experienced by a vehicle that carries the INS. In this regard, the method, apparatus and computer program product of an example embodiment can then determine the velocity of a vehicle in reliance upon the centripetal acceleration of the vehicle making a turn from which one or more filters of the INS may be corrected in order to permit subsequent velocity estimates of the INS to be more accurate. By determining and then relying upon the centripetal acceleration of a vehicle carrying the INS, the INS is able to mitigate the impact of sensor errors, thereby generating a more accurate navigation solution in a more consistent manner.

In an example embodiment, an apparatus is provided that is configured to mitigate error in an inertial navigation system (INS). The apparatus includes processing circuitry and at least one memory including computer program code with the at least one memory and the computer program code configured to, with the processing circuitry, cause the apparatus at least to determine, in conjunction with a turn made by a vehicle carrying the INS, centripetal acceleration experienced by the vehicle. The at least one memory and the computer program code are also configured to, with the processing circuitry, cause the apparatus to determine a velocity of the vehicle in reliance upon the centripetal acceleration and, based on the velocity determined in reliance upon the centripetal acceleration, update one or more filters of the INS to correct a velocity estimate provided by the INS.

The at least one memory and the computer program code are configured to, with the processing circuitry, cause the apparatus of an example embodiment to determine the centripetal acceleration by determining a change between velocity vectors representative of the velocity of the vehicle at different respective points along the turn and determining the centripetal acceleration based upon the change between velocity vectors and a time difference between points in time at which the vehicle is at the respective points along the turn. In an example embodiment, the at least one memory and the computer program code are configured to, with the processing circuitry, cause the apparatus to determine the velocity of the vehicle in reliance also upon a rotation rate of the vehicle. The at least one memory and the computer program code are configured to, with the processing circuitry, cause the apparatus to determine the centripetal acceleration based upon a rotation rate of the vehicle and a turning radius of the vehicle about the turn.

The at least one memory and the computer program code are further configured to, with the processing circuitry, cause the apparatus of an example embodiment to determine an uncertainty estimate based upon the velocity determined in reliance upon the centripetal acceleration and a rotation rate of the vehicle. In an example embodiment, the at least one memory and the computer program code are further configured to, with the processing circuitry, cause the apparatus, in combination with the velocity determined in reliance upon the centripetal acceleration, to backwards process sensor samples and filter states stored in a history buffer in a reverse chronological direction in order to correct a location of the vehicle at one or more points in time prior to the turn made by the vehicle. In an example embodiment, the at least one memory and the computer program code are further configured to, with the processing circuitry, cause the apparatus to identify that the vehicle is making the turn in order to trigger determination of the centripetal acceleration.

In another example embodiment, a method is provided for error mitigation in an inertial navigation system (INS). The method includes determining, in conjunction with a turn made by a vehicle carrying the INS, centripetal acceleration experienced by the vehicle. The method also includes determining a velocity of the vehicle in reliance upon the centripetal acceleration. Based on the velocity determined in reliance upon the centripetal acceleration, the method further includes updating one or more filters of the INS to correct a velocity estimate provided by the INS.

The method of an example embodiment determines the centripetal acceleration by determining a change between velocity vectors representative of the velocity of the vehicle at different respective points along the turn and determining the centripetal acceleration based upon the change between velocity vectors and a time difference between points in time at which the vehicle is at the respective points along the turn. In an example embodiment, the method determines the velocity of the vehicle by determining the velocity of the vehicle also in reliance also upon a rotation rate of the vehicle. The method of an example embodiment determines the centripetal acceleration based upon a rotation rate of the vehicle and a turning radius of the vehicle about the turn.

The method of an example embodiment also includes determining an uncertainty estimate based upon the velocity determined in reliance upon the centripetal acceleration and a rotation rate of the vehicle. In an example embodiment, the method also includes, in combination with the velocity determined in reliance upon the centripetal acceleration, backwards processing sensor samples and filter states stored in a history buffer in a reverse chronological direction in order to correct a location of the vehicle at one or more points in time prior to the turn made by the vehicle. The method of an example embodiment also includes identifying that the vehicle is making the turn in order to trigger determination of the centripetal acceleration.

In an example embodiment, a computer program product is provided that is configured to provide for error mitigation in an inertial navigation system (INS). The computer program product includes at least one non-transitory computer-readable storage medium having computer-executable program code instructions stored therein with the computer-executable program code instructions including program code instructions configured to determine, in conjunction with a turn made by a vehicle carrying the INS, centripetal acceleration experienced by the vehicle. The computer-executable program code instructions also include program code instructions configured to determine a velocity of the vehicle in reliance upon the centripetal acceleration. The computer-executable program code instructions further include program code instructions configured to update, based on the velocity determined in reliance upon the centripetal acceleration, one or more filters of the INS to correct a velocity estimate provided by the INS.

The program code instructions configured to determine the centripetal acceleration in accordance with an example embodiment include program code instructions configured to determine a change between velocity vectors representative of the velocity of the vehicle at different respective points along the turn and program code instructions configured to determine the centripetal acceleration based upon the change between velocity vectors and a time difference between points in time at which the vehicle is at the respective points along the turn. In an example embodiment, the program code instructions configured to determine the velocity of the vehicle include program code instructions configured to determine the velocity of the vehicle also in reliance also upon a rotation rate of the vehicle. In an example embodiment, the program code instructions configured to determine the centripetal acceleration is based upon a rotation rate of the vehicle and a turning radius of the vehicle about the turn.

The computer-executable program code instructions of an example embodiment also include program code instructions configured to determine an uncertainty estimate based upon the velocity determined in reliance upon the centripetal acceleration and a rotation rate of the vehicle. In an example embodiment, the computer-executable program code instructions further include program code instructions configured, in combination with the velocity determined in reliance upon the centripetal acceleration, to backwards process sensor samples and filter states stored in a history buffer in a reverse chronological direction in order to correct a location of the vehicle at one or more points in time prior to the turn made by the vehicle. The computer-executable program code instructions of an example embodiment further include program code instructions configured to identify that the vehicle is making the turn in order to trigger determination of the centripetal acceleration.

In a further example embodiment, an apparatus is provided that is configured to provide for error mitigation in an inertial navigation system (INS). The apparatus includes means for determining, in conjunction with a turn made by a vehicle carrying the INS, centripetal acceleration experienced by the vehicle. The apparatus also includes means for determining a velocity of the vehicle in reliance upon the centripetal acceleration and means, based on the velocity determined in reliance upon the centripetal acceleration, for updating one or more filters of the INS to correct a velocity estimate provided by the INS.

The means for determining the centripetal acceleration includes, in an example embodiment, means for determining a change between velocity vectors representative of the velocity of the vehicle at different respective points along the turn and means for determining the centripetal acceleration based upon the change between velocity vectors and a time difference between points in time at which the vehicle is at the respective points along the turn. In an example embodiment, the means for determining the velocity of the vehicle includes means for determining the velocity of the vehicle also in reliance also upon a rotation rate of the vehicle. In an example embodiment, the means for determining the centripetal acceleration is based upon a rotation rate of the vehicle and a turning radius of the vehicle about the turn.

The apparatus of an example embodiment includes means for determining an uncertainty estimate based upon the velocity determined in reliance upon the centripetal acceleration and a rotation rate of the vehicle. In an example embodiment, the apparatus also includes means, in combination with the velocity determined in reliance upon the centripetal acceleration, for backwards processing sensor samples and filter states stored in a history buffer in a reverse chronological direction in order to correct a location of the vehicle at one or more points in time prior to the turn made by the vehicle. The apparatus of an example embodiment also includes means for identifying that the vehicle is making the turn in order to trigger determination of the centripetal acceleration.

In an example embodiment, an apparatus is provided that is configured to mitigate error in an inertial navigation system (INS). The apparatus includes processing circuitry and at least one memory including computer program code with the at least one memory and the computer program code configured to, with the processing circuitry, cause the apparatus at least to determine, in conjunction with a turn made by a vehicle carrying the INS, a change between velocity vectors representative of a velocity of the vehicle at different respective points along the turn. The at least one memory and the computer program code are also configured to, with the processing circuitry, cause the apparatus to determine centripetal acceleration experienced by the vehicle based upon the change between the velocity vectors. The at least one memory and the computer program code are further configured to, with the processing circuitry, cause the apparatus to determine a tangential velocity of the vehicle based upon the centripetal acceleration and a rotation rate of the vehicle and, based on the tangential velocity, to correct a velocity estimate provided by the INS.

The at least one memory and the computer program code are configured to, with the processing circuitry, cause the apparatus of an example embodiment to determine the centripetal acceleration based also upon a time difference between points in time at which the vehicle is at the respective points along the turn. In an example embodiment, the at least one memory and the computer program code are configured to, with the processing circuitry, cause the apparatus to determine the tangential velocity based upon a magnitude of a ratio of the centripetal acceleration to the rotation rate of the vehicle. The at least one memory and the computer program code are further configured to, with the processing circuitry, cause the apparatus of an example embodiment to determine an uncertainty estimate based upon the tangential velocity determined in reliance upon the centripetal acceleration and the rotation rate of the vehicle.

The at least one memory and the computer program code are further configured to, with the processing circuitry, cause the apparatus of an example embodiment, in combination with the tangential velocity determined in reliance upon the centripetal acceleration, to backwards process sensor samples and filter states stored in a history buffer in a reverse chronological direction in order to correct a location of the vehicle at one or more points in time prior to the turn made by the vehicle. In an example embodiment, the at least one memory and the computer program code are further configured to, with the processing circuitry, cause the apparatus to identify that the vehicle is making the turn in order to trigger determination of the change between velocity vectors. In an example embodiment, a method is provided to mitigate error in an inertial navigation system (INS). The method includes determining, in conjunction with a turn made by a vehicle carrying the INS, a change between velocity vectors representative of a velocity of the vehicle at different respective points along the turn. The method also includes determining centripetal acceleration experienced by the vehicle based upon the change between the velocity vectors and determining a tangential velocity of the vehicle based upon the centripetal acceleration and a rotation rate of the vehicle. Based on the tangential velocity, the method further includes correcting a velocity estimate provided by the INS.

The method of an example embodiment determines the centripetal acceleration based also upon a time difference between points in time at which the vehicle is at the respective points along the turn. In an example embodiment, the method determines the tangential velocity based upon a magnitude of a ratio of the centripetal acceleration to the rotation rate of the vehicle. The method of an example embodiment determines an uncertainty estimate based upon the tangential velocity determined in reliance upon the centripetal acceleration and the rotation rate of the vehicle.

The method of an example embodiment further includes, in combination with the tangential velocity determined in reliance upon the centripetal acceleration, backwards processing sensor samples and filter states stored in a history buffer in a reverse chronological direction in order to correct a location of the vehicle at one or more points in time prior to the turn made by the vehicle. In an example embodiment, the method also includes identifying that the vehicle is making the turn in order to trigger determination of the change between velocity vectors.

In a further example embodiment, a computer program product is provided that is configured to mitigate error in an inertial navigation system (INS). The computer program product includes at least one non-transitory computer-readable storage medium having computer-executable program code instructions stored therein with the computer-executable program code instructions including program code instructions configured to determine, in conjunction with a turn made by a vehicle carrying the INS, a change between velocity vectors representative of a velocity of the vehicle at different respective points along the turn. The computer-executable program code instructions also include program code instructions configured to determine centripetal acceleration experienced by the vehicle based upon the change between the velocity vectors and determining a tangential velocity of the vehicle based upon the centripetal acceleration and a rotation rate of the vehicle. Based on the tangential velocity, the computer-executable program code instructions further include program code instructions configured to correct a velocity estimate provided by the INS.

The program code instructions of an example embodiment are configured to determine the centripetal acceleration based also upon a time difference between points in time at which the vehicle is at the respective points along the turn. In an example embodiment, the program code instructions are configured to determine the tangential velocity based upon a magnitude of a ratio of the centripetal acceleration to the rotation rate of the vehicle. The program code instructions of an example embodiment are configured to determine an uncertainty estimate based upon the tangential velocity determined in reliance upon the centripetal acceleration and the rotation rate of the vehicle.

The program code instructions of an example embodiment are further configured, in combination with the tangential velocity determined in reliance upon the centripetal acceleration, to backwards process sensor samples and filter states stored in a history buffer in a reverse chronological direction in order to correct a location of the vehicle at one or more points in time prior to the turn made by the vehicle. In an example embodiment, the program code instructions are also configured identify that the vehicle is making the turn in order to trigger determination of the change between velocity vectors.

In yet another example embodiment, an apparatus is provided to mitigate error in an inertial navigation system (INS). The apparatus includes means for determining, in conjunction with a turn made by a vehicle carrying the INS, a change between velocity vectors representative of a velocity of the vehicle at different respective points along the turn. The apparatus also includes means for determining centripetal acceleration experienced by the vehicle based upon the change between the velocity vectors and determining a tangential velocity of the vehicle based upon the centripetal acceleration and a rotation rate of the vehicle. Based on the tangential velocity, the apparatus further includes means for correcting a velocity estimate provided by the INS.

The means for determining the centripetal acceleration in accordance with an example embodiment includes means for determining the centripetal acceleration based also upon a time difference between points in time at which the vehicle is at the respective points along the turn. In an example embodiment, the means for determining the tangential velocity includes means for determining the tangential velocity based upon a magnitude of a ratio of the centripetal acceleration to the rotation rate of the vehicle. The apparatus of an example embodiment also includes means for determining an uncertainty estimate based upon the tangential velocity determined in reliance upon the centripetal acceleration and the rotation rate of the vehicle.

The apparatus of an example embodiment further includes means, in combination with the tangential velocity determined in reliance upon the centripetal acceleration, for backwards processing sensor samples and filter states stored in a history buffer in a reverse chronological direction in order to correct a location of the vehicle at one or more points in time prior to the turn made by the vehicle. In an example embodiment, the apparatus also includes means for identifying that the vehicle is making the turn in order to trigger determination of the change between velocity vectors.

BRIEF DESCRIPTION OF THE DRAWINGS

Having thus described example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in order to mitigate error in an inertial navigation system (INS). In this regard, a method, apparatus and computer program product estimate the velocity of a vehicle based upon the centripetal acceleration of the vehicle as the vehicle carrying the INS makes a turn. Utilizing the velocity of the vehicle as estimated based upon the centripetal acceleration experienced by the vehicle making the turn, one or more filters of the INS may be updated to correct the velocity estimate provided by the INS, thereby eliminating or reducing errors in the velocity estimate provided by the INS due to, for example, drift over time. In some example embodiments, the estimation of the velocity of the vehicle based upon the centripetal acceleration experienced by the vehicle making a turn permits the method, apparatus and computer program product to reevaluate sensor samples and filter states that have been stored from prior points in time in order to correct the location of the vehicle, not only at the present point in time, but also at one or more points in time prior to the turn being made by the vehicle, thereby allowing the location of the vehicle, both presently and at the one or more prior points in time to be corrected. By mitigating the error in the INS, the method, apparatus and computer program product of an example embodiment permits the INS to more accurately determine the velocity and location of the vehicle and to reduce or eliminate the drift experienced by the velocity estimate of the INS due to, for example, sensor errors, noise and other factors. Thus, the method, apparatus and computer program product of an example embodiment provides for improved dead-reckoning performance including in environments in which assess to GNSS or other positioning solutions is unavailable or are otherwise limited, such as in urban environments, e.g., in urban canyons and parking garages.

Figure 2:
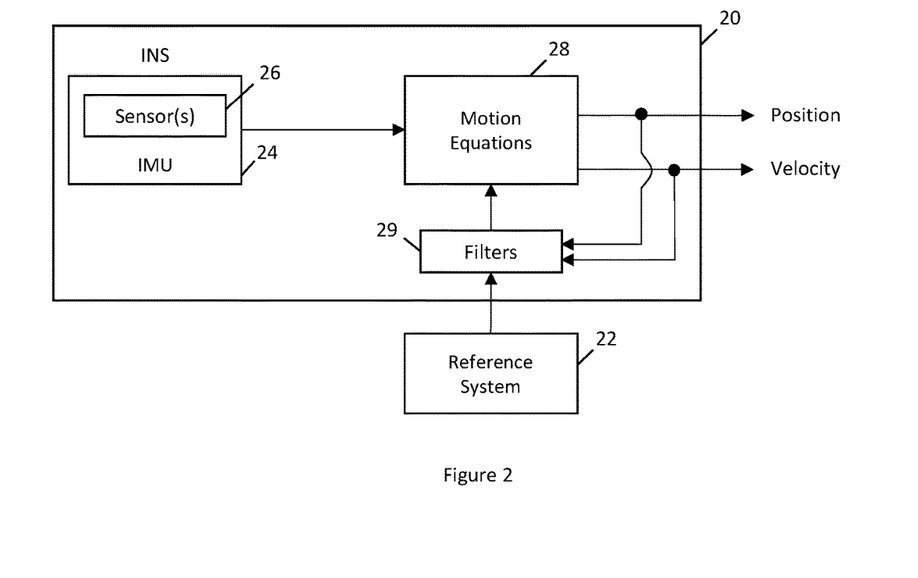
FIG. 2 is a block diagram of an inertial navigation system (INS) that may be configured in accordance with an example embodiment of the present disclosure.

FIG. 2 depicts a system that includes an INS 20 and a reference system 22 in communication therewith. As shown, the INS of this example embodiment includes an inertial measurement unit (IMU) 24 which, in turn, includes one or more sensors 26, such as one or more accelerometers, magnetometers, gyroscopes or the like, for providing sensor samples relating to the motion of the object, such as a vehicle, a person, a device, such as a device carried by a vehicle or a person, or the like. In this regard, the INS or at least the IMU is generally carried by the object for which a navigation solution is desired such that the motion of the object is the same as the motion experienced by the IMU. The INS also includes a plurality of motion equations 28, such as may be implemented by a processor or other computing device. The motion equations receive sensor samples indicative of various parameters of the motion of the object, such as parameters indicative of the movement of the object along each of the coordinate axes and parameters indicative of the rotation of the object about each of the coordinate axes. Based upon the sensor samples, the motion equations provide a navigation solution, such as the current position and velocity of the object monitored by the INS.

In order to reduce the errors associated with the navigation solution including those errors attributable to drift experienced by the sensors 26, such as in response to variations in the temperature, the INS 20 also includes a plurality of filters 29, such as one or more Kalman filters. The filters receive the navigation solution, such as the position and velocity, that has been generated by the motion equations 28 and provides feedback to the motion equations in order to reduce the error in the navigation solution. As shown in FIG. 2, the INS may be in communication with a reference system 22, such as a satellite-based positioning system, and, in one embodiment that is described herein by way of example, but not of limitation, a GNSS-based positioning system. The reference system provides observations at each of a plurality of different points in time. The observations may define the position and velocity of the object as determined by the reference system at a respective point in time. Based upon a comparison of the position and velocity of the object as determined by the reference system and the position and velocity of the object as determined by the INS, the filter parameters that define the operation and function of the filters are updated. However, over time during which the system relies upon dead reckoning as supported by INS to determine the location of the object, such as the vehicle carrying the INS, the error associated with the navigation solution of the INS may again increase and, in some cases may cause the filters to deviate or diverge over time.

Figure 3:
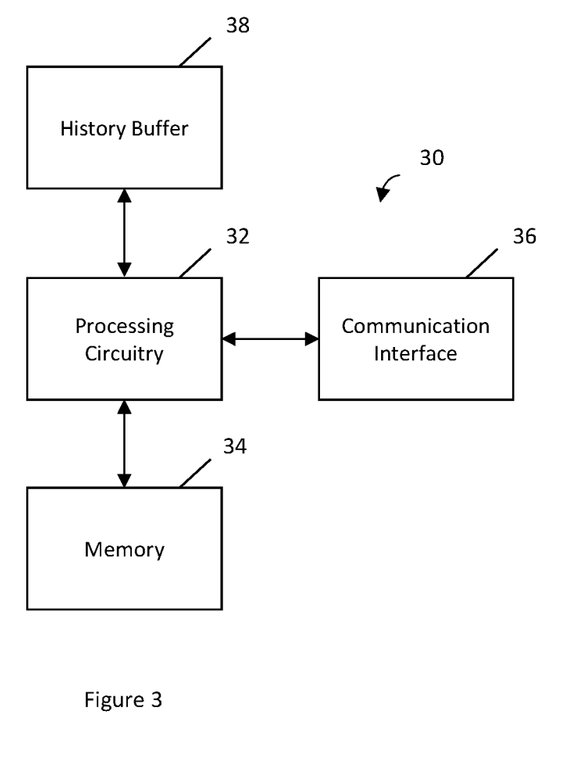
FIG. 3 is a block diagram of an apparatus that may be specifically configured in accordance with an example embodiment in order to mitigate error in an inertial navigation system (INS) in accordance with an example embodiment.

In order to mitigate the error in the INS 20, an apparatus 30 is provided that may be embodied by a computing device, such as the computing device that embodies the INS or another computing device that is in communication with the INS. Alternatively, the apparatus may be embodied by a cloud-based computing system that is also in communication, directly or indirectly, with the INS. Regardless of the manner in which the apparatus is embodied, the apparatus of an example embodiment includes, is associated with or is in communication with processing circuitry 32, a memory device 34 and a communication interface 36, as shown in FIG. 3.

In some embodiments, the processing circuitry 32 (and/or co-processors or any other processors assisting or otherwise associated with the processing circuitry) can be in communication with the memory device 34 via a bus for passing information among components of the apparatus 30. The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the apparatus to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 32 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 32 can be configured to execute instructions stored in the memory device 34 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 30 of an example embodiment can also include the communication interface 36. The communication interface can be any means such as a device or circuitry embodied in either hardware or a combination of hardware and software that is configured to receive and/or transmit data from/to other electronic devices in communication with the apparatus. The communication interface can be configured to communicate in accordance with various wireless protocols including Global System for Mobile Communications (GSM), such as but not limited to Long Term Evolution (LTE), Fifth-Generation (5G) telecommunications protocols or the like. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

Figure 4:
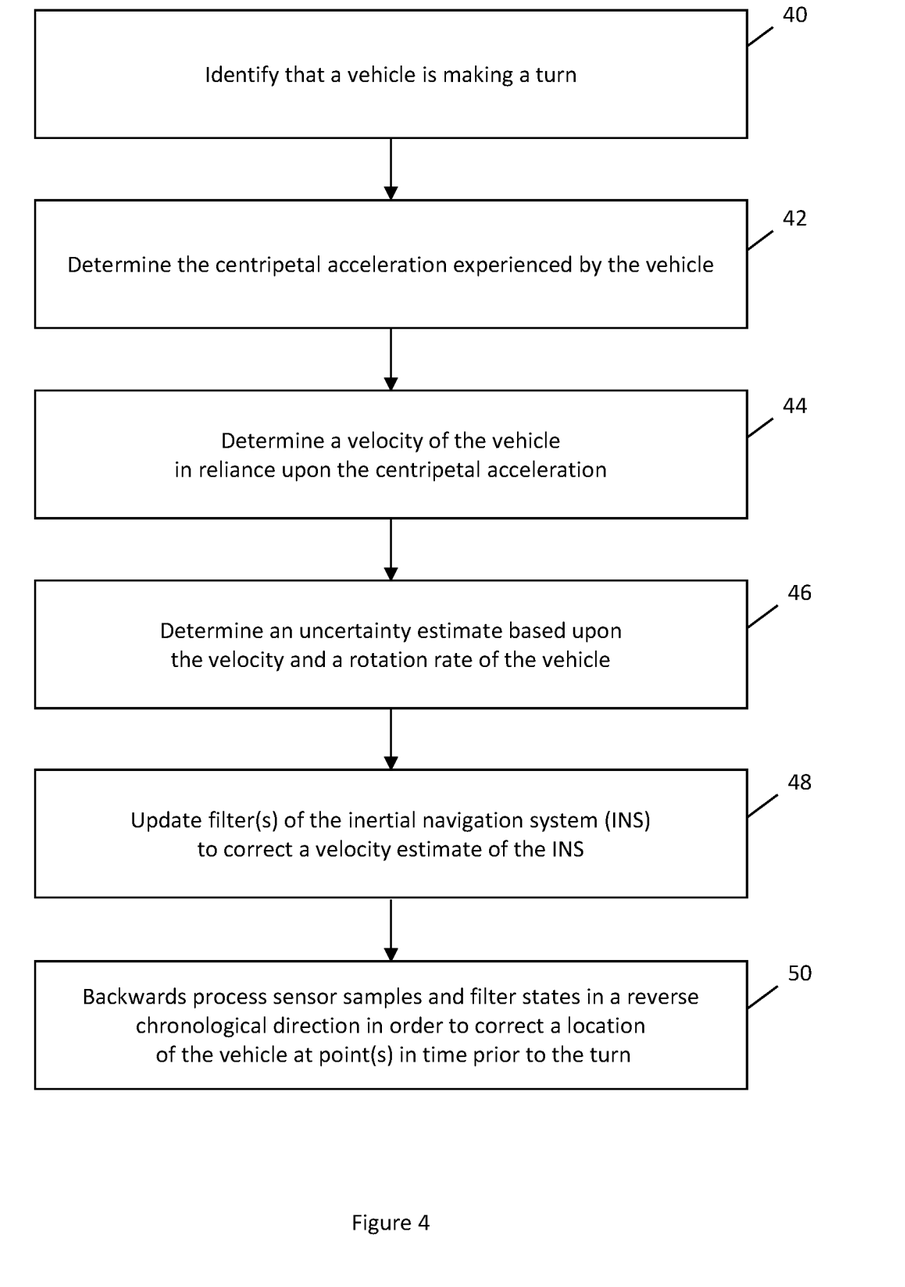
FIG. 4 is a flow chart illustrating the operations performed, such as by the apparatus of FIG. 3, in order to provide for error mitigation in an INS in accordance with an example embodiment of the present disclosure based upon the centripetal acceleration experienced by a vehicle carrying the INS.

Referring now to FIG. 4, the operations performed, such as by the apparatus 30 of FIG. 3, in order to mitigate the error of an INS 20 based upon the centripetal acceleration of a vehicle carrying the INS are depicted. As the vehicle only experiences centripetal acceleration during a turn, the apparatus of an example embodiment includes means, such as the processing circuitry 32, one or more sensors 26 or the like, to identify that the vehicle is making a turn in order to trigger determination of the centripetal acceleration. See block 40 of FIG. 4. The apparatus may be configured to identify that the vehicle is making a turn in various manners. For example, the apparatus, such as the processing circuitry, may be configured to receive information from the vehicle identifying the steering angle. In this embodiment, the apparatus, such as the processing circuitry, may be configured to determine that the vehicle is making a turn in an instance in which the steering angle has an absolute value that exceeds a predefined threshold, such as an absolute value of greater than seven degrees, for at least a predetermined length of time. Additionally or alternatively, the apparatus of an example embodiment may be configured to identify that the vehicle is making a turn based on information regarding the rotation rate (also known as the heading rate) of the vehicle provided, for example, by a sensor, such as a gyroscope, of the INS. In this example embodiment, the apparatus, such as the processing circuitry, is configured to determine that the vehicle is making a turn in an instance in which the rotation rate equals or exceeds at least a predetermined threshold for at least a predetermined amount of time.

In conjunction with the turn being made by a vehicle carrying the INS 20, such as in response to determining that the vehicle is making the turn, the apparatus 30 of an example embodiment includes means, such as the processing circuitry 32 or the like, for determining the centripetal acceleration experienced by the vehicle. See block 42 of FIG. 4. The apparatus may be configured to determine the centripetal acceleration in various manners. In one example embodiment depicted in FIG. 5 and after determining that the vehicle is making a turn as described above and as also depicted in block 60 of FIG. 5, the apparatus includes means, such as the processing circuitry, one or more sensors 26 or the like, for determining the centripetal acceleration by determining a change between velocity vectors representative of the velocity of the vehicle at different respective points along the turn. See block 62 of FIG. 5.

Figure 6:
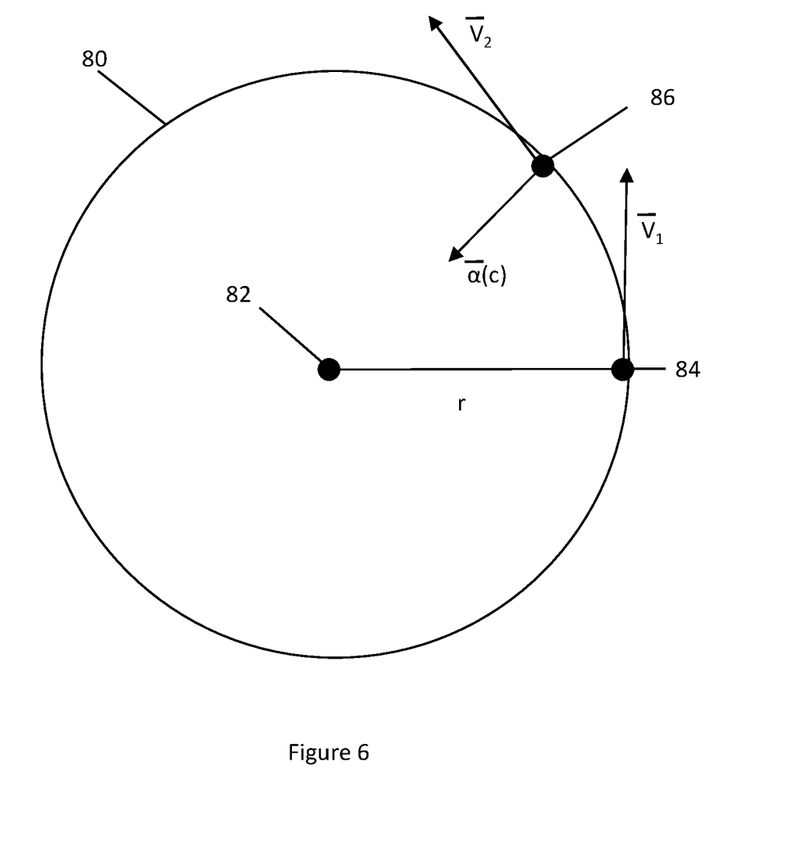
FIG. 6 illustrates the determination of velocity vectors at different points in time along a turn from which the centripetal acceleration is determined in accordance with the example embodiment to the present disclosure.

As shown in FIG. 6, for example, a vehicle that is making a turn, such as about an arc of a circle 80 centered at 82 and having a radius of r, has a plurality of velocity vectors at different points in time about the turn. Each velocity vector may be defined in the navigation frame, that is, at the local level, such as based upon a velocity estimate provided by the INS 20 at the respective point in time. Due to the non-holonomic constraints, the motion of a vehicle making a turn follows a circular path that is defined by vehicle measures and the continuity of the road curvature. Even in an instance in which the vehicle maintains the same speed as the vehicle makes the turn, the velocity vector of the vehicle that is defined at different points in time along the curve differs due to the different directions in which the vehicle is traveling at different points along the turn. Although the velocity vector is determined at two points along the turn made by a vehicle are depicted in FIG. 6, the velocity vector of a vehicle may be determined at three or more points along the turn in other example embodiments with the two velocity vectors $\bar{v}_1$ and $\bar{v}_2$ determined at points 84 and 86, respectively, being provided by way of example but not of limitation.

In this example embodiment, the apparatus 30 also includes means, such as the processing circuitry 32 or the like, for determining centripetal acceleration experienced by the vehicle based upon the change between the velocity vectors determined at different points in time along the turn. See block 64 of FIG. 5. As shown in FIG. 6, centripetal acceleration $\bar{a}(c)$ is a vector value pointing in the direction of the change in velocity, that is, pointing towards the center of rotation 82. In the example embodiment depicted in FIG. 6, the centripetal acceleration $\bar{a}(c)$ at the second point 86 in time at which $\bar{v}_2$ is determined provides for the determination of the centripetal acceleration $\bar{a}(c)$ pointing towards the center of rotation from the point along the circle at which the second velocity vector $\bar{v}_2$ was determined.

Based upon the velocity vectors representative to the velocity of the vehicle at different respective points in time along the turn, the apparatus 30, such as the processing circuitry 32, of this example embodiment is configured to determine the change in the velocity vectors, namely delta (υ) which is defined as delta($\bar{v}$)=$\bar{v}_2$−$\bar{v}_1$. The apparatus of an example embodiment also includes means, such as the processing circuitry or the like, for determining the centripetal acceleration based not only upon the change between the velocity vectors delta(υ), but also based upon a difference in time between the points in time at which the vehicle was at the different respective points along the turn. Assuming that the change in time delta(t) between the points in time at which the velocity vectors are defined is small, the centripetal acceleration is defined as $\bar{a}(c)$=delta(υ)/delta(t). In the example of FIG. 6, delta(t) is the difference in time between points in time 84 and 86.

As shown in block 44 of FIG. 4, after having determined a centripetal acceleration experienced by the vehicle, such as in the manner described above in conjunction with the embodiment of FIG. 5, the apparatus 30 of an example embodiment also includes means, such as the processing circuitry 32 or the like, for determining the velocity of the vehicle in reliance upon the centripetal acceleration. As described below, the apparatus of an example embodiment also includes means, such as the processing circuitry or the like, for determining the velocity of the vehicle in reliance not only upon the centripetal acceleration, but also the rotation rate of the vehicle.

Figure 5:
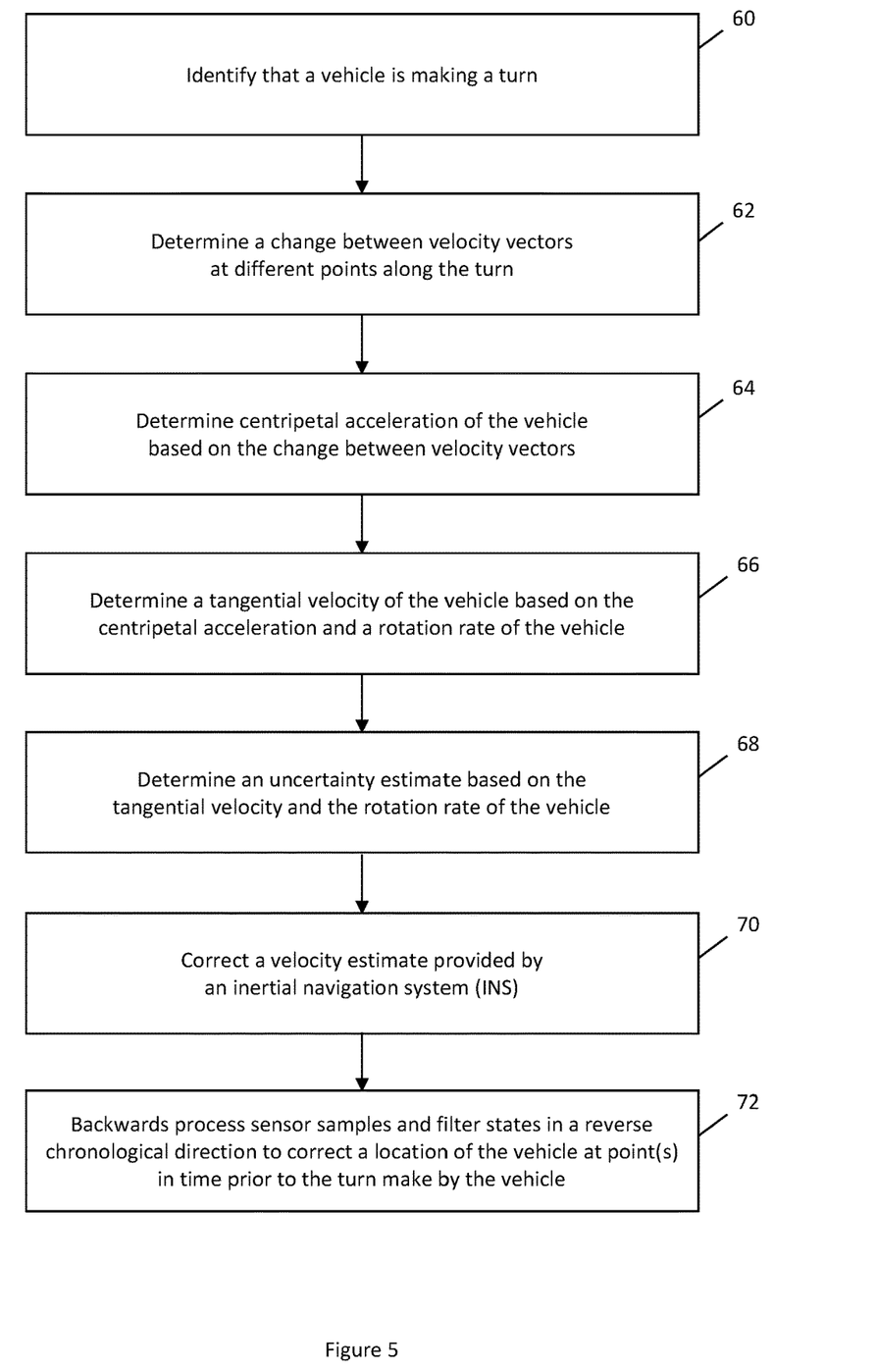
FIG. 5 is a flow chart of the operations performed, such as by the apparatus of FIG. 2, in order to in order to provide for error mitigation in an INS in accordance with another example embodiment of the present disclosure.

Although the velocity of the vehicle may be determined in reliance upon the centripetal acceleration in various manners, the apparatus 30, such as the processing circuitry 32, of an example embodiment depicted in FIG. 5 and described above, determines the velocity of the vehicle, namely, the tangential velocity of the vehicle, based upon both the centripetal acceleration and rotation rate of the vehicle. See block 66 of FIG. 5. As noted, the velocity of the vehicle in this example embodiment is the tangential velocity, that is, the velocity of the vehicle in a direction tangent to the circle 80 about which the vehicle is turning at the point in time at which a velocity vector, such as at the point 86 in time at which the second velocity vector $\bar{v}_2$, is determined. In this example embodiment, the apparatus includes means, such as the processing circuitry or the like, for determining the tangential velocity based upon a magnitude of a ratio of the centripetal acceleration to the rotation rate of the vehicle, such as provided, for example, by the sensors 26, e.g., a gyroscope, of the INS 20. In this regard, the velocity $\bar{v}$ of the vehicle, that is, the tangential velocity, may be defined as follows: $\bar{v}=\bar{a}(c)/w$ in which w is a rotation rate provided by a gyroscope of the INS. In other words, the velocity of the vehicle, such as the tangential velocity of the vehicle, may be defined in an example embodiment as $\bar{v}=\text{delta}(\bar{v})/(w*\text{delta}(t))$.

As shown in block 48 of FIG. 4, based on the velocity of the vehicle, such as the tangential velocity of the vehicle, determined in reliance upon the centripetal acceleration, the apparatus 30 of an example embodiment includes means, such as the processing circuitry 32 or the like, for updating one or more filters 29 of the INS 20 to correct the velocity estimate provided by the INS. As such, drift in the velocity estimate provided by the INS may be reduced or eliminated at least at the point in time at which the velocity of the vehicle is determined based upon the centripetal acceleration. In terms of the example provided by the embodiment of FIG. 5, the apparatus therefore includes means, such as the processing circuitry or the like, for correcting the velocity estimate provided by the INS based on the tangential velocity that has been determined based, in turn, upon the centripetal acceleration and the rotation rate of the vehicle. See block 70 of FIG. 5. By updating the filter(s) of the INS and correcting the velocity estimate provided by the INS, the INS can provide more accurate velocity estimates for at least a period of time, thereby permitting the location of the vehicle to be more accurately estimated and improving the dead-reckoning performance supported by the INS which, in turn, provides for improved positioning estimates for the vehicle. These improved positioning estimates for the vehicle may be provided in various environments including environments, such as in urban environments, e.g. parking garages, urban canyons or the like, in which other positioning techniques, such as those supported by GNSS or other satellite-based positioning techniques, are unavailable or have increased uncertainty associated therewith.

As noted above, the centripetal acceleration experienced by the vehicle may be determined in various manners such that the velocity of the vehicle that is determined based upon the centripetal acceleration may, in turn, be determined in different manners. By way of another example, the apparatus 30 of this other example embodiment includes means, such as the processing circuitry 32, one or more sensors 26 of the INS 20 or the like, for determining the centripetal acceleration based upon the rotation rate of the vehicle and a turning radius of the vehicle about the turn. In this regard, the rotation rate w of a vehicle may be defined based upon the speed of the vehicle as follows: $w=v/r$ in which w is the rotation rate of the vehicle, v is the vehicle speed, that is, the tangential velocity of the vehicle, and r is the turning radius of the vehicle as shown, for example, in FIG. 6 which is assumed to be constant or nearly constant. When a vehicle makes a turn, the vehicle experiences centripetal acceleration which depends on the tangential speed of the vehicle and the turning radius. The centripetal acceleration $\bar{a}(c)$ can therefore be defined as $\bar{a}(c)=w^{2*}r$. In an instance in which the non-holonomic constraints are satisfied and the vehicle is not skidding or drifting, the tangential velocity of the vehicle $\bar{v}$ can be defined as $\bar{v}=\bar{a}(c)/w$. Since the rotation rate w, as well as the centripetal acceleration $\bar{a}(c)$ can be measured by the INS, such as by a gyroscope and accelerometer, respectively, of the INS, the apparatus, such as the processing circuitry, of this example embodiment is configured to determine the velocity, that is, the tangential velocity, based upon the measurements of the rotation rate provided by the gyroscope and the measurement of the centripetal acceleration provided by the accelerometer of the INS.

In accordance with this example embodiment, the estimation accuracy of the velocity of the vehicle, that is, the tangential velocity of the vehicle, is generally sufficiently accurate in an instance in which the vehicle has a speed of less than a predefined threshold and in an instance in which the rotation rate exceeds a predefined angular threshold. The estimation accuracy of the velocity of the vehicle determined in accordance with this example embodiment may diminish, however, in an instance in which the speed of the vehicle exceeds the predetermined speed threshold or in an instance in which the rotation rate is less than the predefined angular threshold.

Regardless of the manner in which the velocity of the vehicle is determined in reliance upon the centripetal acceleration and as noted above, the apparatus 30, such as the processing circuitry 32, of an example embodiment is configured to update one or more filters 29 of the INS 20 to correct the velocity estimate provided by the INS as depicted in blocks 48 of FIG. 4 and 70 of FIG. 5. In this regard, the correction of the velocity estimate provided by the INS provides for improved estimates of the vehicle speed in the navigation frame. In this regard, the apparatus may include means, such as the processing circuitry, for converting the velocity of the vehicle as determined in reliance upon the centripetal acceleration in the vehicle or local frame to the navigation frame utilizing, for example, a vehicle to navigation frame orientation quaternion that is estimated and maintained by the INS.

Additionally, the apparatus 30 of an example embodiment includes means, such as the processing circuitry 32 or the like, for utilizing the velocity determined in reliance upon the centripetal acceleration in order to correct the location of the vehicle at one or more points in time prior to the turn being made by the vehicle. In this example embodiment and as depicted in block 50 of FIG. 4 and block 72 of FIG. 5, the apparatus, such as the processing circuitry, of this example embodiment is configured to rely upon the velocity, such as the tangential velocity, of the vehicle determined in reliance upon the centripetal acceleration, in order to backwards process the sensor samples and filter states stored in a history buffer 38 in a reverse chronological direction.

In this regard, a history buffer 38 is maintained so as to store the sensor samples captured by the one or more sensors 26 in association with an identification of the time at which the sensor samples were captured. Additionally, the history buffer may store filter parameters of the one or more filters 29 of the INS 20 in association with an indication of the time at which the filter parameters were valid. As such, the apparatus 30, such as the processing circuitry 32, of this example embodiment is configured to process the sensor samples stored by the history buffer beginning with the most recent sensor samples and then proceeding in a reverse chronological direction so as to thereafter process prior sensor samples stored in the history buffer. As a result of the backwards processing, the state of the one or more filters of the INS is correspondingly propagated from the current state of the filter(s) of the INS (as updated based upon the velocity of the vehicle as determined in reliance upon the centripetal acceleration) to a prior state of the filter(s) of the INS. Further details regarding the backwards processing the sensor samples and filter states are provided by U.S. patent application Ser. No. 17/657,218, filed Mar. 30, 2022, the contents of which are incorporated herein by reference.

Based upon this backwards processing, the apparatus 30, such as the processing circuitry 32, is configured to correct the location of the vehicle at one or more points in time prior to the turn being made by the vehicle. As a result, the apparatus of this example embodiment provides for compensation of any overshoots or undershoots attributable to prior inaccuracies in the velocity of the vehicle as estimated by the INS 20 and, in turn, any corresponding inaccuracies in the estimates of the location of the vehicle. In an example embodiment, the backwards processing and the correction of the location of the vehicle based on the backwards processing may be performed in the background concurrently with the determination by the INS of the velocity and location of the vehicle carrying the INS.

In an example embodiment, the apparatus 30 includes means, such as the processing circuitry 32 or the like, for determining an uncertainty estimate based upon the velocity determined in reliance upon the centripetal acceleration and a rotation rate of the vehicle. See block 46 of FIG. 4 and block 68 of FIG. 5. The uncertainty estimate provides a measure of the reliance that should be placed in the centripetal acceleration and, in turn, the velocity, such as the tangential velocity, of the vehicle that has been determined. In an example embodiment, the determination of a greater uncertainty estimate reduces the reliance that should be made upon the centripetal acceleration and the vehicle velocity, such as the tangential velocity, of the vehicle such that the apparatus, such as the processing circuitry, may still be configured to update the one or more filters of the INS 20 based upon the velocity of the vehicle, such as the tangential velocity, determined in reliance upon the centripetal acceleration, but may rely less upon the velocity of the vehicle determined in reliance upon the centripetal acceleration in conjunction with the updating of the filter(s) of the INS. Conversely, the determination of a smaller uncertainty estimate increases the reliance that should be made upon the centripetal acceleration and the vehicle velocity, such as the tangential velocity, of the vehicle such that the apparatus, such as the processing circuitry, may be configured to update the one or more filters of the INS based upon the velocity of the vehicle, such as the tangential velocity, determined in reliance upon the centripetal acceleration, with even more reliance placed upon the velocity of the vehicle determined in reliance upon the centripetal acceleration in conjunction.

Although the uncertainty estimate may be defined in various manners, the apparatus 30, such as the processing circuitry 32, of one example embodiment is configured to derive the uncertainty estimate std based on the rotation rate w as std=$\frac{1}{3}$*T*υ/r=$\frac{1}{3}$*T*w. The velocity υ is the velocity estimate as updated based upon the centripetal acceleration as described above. In addition, T is a tuning coefficient, which may be empirically determined.

As described above, a method, apparatus 30 and computer program product provide for error mitigation in an INS 20 based upon centripetal acceleration experienced by a vehicle that carries the INS. In this regard, the method, apparatus and computer program product of an example embodiment can then determine the velocity of a vehicle in reliance upon the centripetal acceleration of the vehicle making a turn from which one or more filters of the INS may be corrected in order to permit subsequent velocity estimates of the INS to be more accurate. By determining and then relying upon the centripetal acceleration of a vehicle carrying the INS, the INS is able to mitigate the impact of sensor errors, including sensor drift, thereby generating a more accurate navigation solution in a more consistent manner.

As described above, FIGS. 4 and 5 are flow diagrams of an apparatus 30, method, and computer program product configured to mitigate errors in an INS based upon the centripetal acceleration experienced by a vehicle according to an example embodiment. It will be understood that each block of the flow diagrams, and combinations of blocks in the flow diagrams, may be implemented by various means, such as hardware, firmware, processing circuitry 32, and/or other devices associated with execution of software including one or more computer program instructions. For example, one or more of the procedures described above may be embodied by computer program instructions. In this regard, the computer program instructions which embody the procedures described above may be stored by the memory device 34 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the blocks of the flow diagrams. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flow diagrams.

Accordingly, blocks of the flow diagrams support combinations of means for performing the specified functions and combinations of operations for performing the specified functions. It will also be understood that one or more blocks of the flow diagrams, and combinations of blocks in the flow diagrams, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus configured to mitigate error in an inertial navigation system (INS), the apparatus comprising processing circuitry and at least one memory including computer program code, the at least one memory and the computer program code configured to, with the processing circuitry, cause the apparatus at least to:
   in conjunction with a turn made by a vehicle carrying the INS, determine centripetal acceleration experienced by the vehicle;
   determine a velocity of the vehicle in reliance upon the centripetal acceleration;
   based on the velocity determined in reliance upon the centripetal acceleration, update one or more filters of the INS to correct a velocity estimate provided by the INS;
   store sensor samples and filter states of the INS in a history buffer in associated with time values; and
   in combination with the velocity determined in reliance upon the centripetal acceleration, backwards process the sensor samples and the filter states stored in the history buffer in a reverse chronological direction to propagate corrected filter states, thereby correcting a location estimate of the vehicle at one or more points in time prior to the turn made by the vehicle.

2. The apparatus according to claim 1, wherein the at least one memory and the computer program code are configured to, with the processing circuitry, cause the apparatus to determine the centripetal acceleration by:
   determining a change between velocity vectors representative of the velocity of the vehicle at different respective points along the turn; and
   determining the centripetal acceleration based upon the change between velocity vectors and a time difference between points in time at which the vehicle is at the respective points along the turn.

3. The apparatus according to claim 1, wherein the at least one memory and the computer program code are configured to, with the processing circuitry, cause the apparatus to determine the velocity of the vehicle in reliance also upon a rotation rate of the vehicle.

4. The apparatus according to claim 1, wherein the at least one memory and the computer program code are configured to, with the processing circuitry, cause the apparatus to determine the centripetal acceleration based upon a rotation rate of the vehicle and a turning radius of the vehicle about the turn.

5. The apparatus according to claim 1, wherein the at least one memory and the computer program code are further configured to, with the processing circuitry, cause the apparatus to determine an uncertainty estimate based upon the velocity determined in reliance upon the centripetal acceleration and a rotation rate of the vehicle.

6. The apparatus according to claim 1, wherein the at least one memory and the computer program code are further configured to, with the processing circuitry, cause the apparatus to identify that the vehicle is making the turn in order to trigger determination of the centripetal acceleration.

7. A method for error mitigation in an inertial navigation system (INS), the method comprising:
   in conjunction with a turn made by a vehicle carrying the INS, determining centripetal acceleration experienced by the vehicle;
   determining a velocity of the vehicle in reliance upon the centripetal acceleration;
   based on the velocity determined in reliance upon the centripetal acceleration, updating one or more filters of the INS to correct a velocity estimate provided by the INS;
   storing sensor samples and filter states of the INS in a history buffer in associated with time values; and
   in combination with the velocity determined in reliance upon the centripetal acceleration, backwards processing the sensor samples and the filter states stored in the history buffer in a reverse chronological direction to propagate corrected filter states, thereby correcting a location estimate of the vehicle at one or more points in time prior to the turn made by the vehicle.

8. The method according to claim 7, wherein determining the centripetal acceleration comprises:
   determining a change between velocity vectors representative of the velocity of the vehicle at different respective points along the turn; and
   determining the centripetal acceleration based upon the change between velocity vectors and a time difference between points in time at which the vehicle is at the respective points along the turn.

9. The method according to claim 7, wherein determining the velocity of the vehicle comprises determining the velocity of the vehicle also in reliance also upon a rotation rate of the vehicle.

10. The method according to claim 7, wherein determining the centripetal acceleration is based upon a rotation rate of the vehicle and a turning radius of the vehicle about the turn.

11. The method according to claim 7, further comprises determining an uncertainty estimate based upon the velocity determined in reliance upon the centripetal acceleration and a rotation rate of the vehicle.

12. The method according to claim 7, further comprising identifying that the vehicle is making the turn in order to trigger determination of the centripetal acceleration.

13. An apparatus configured to mitigate error in an inertial navigation system (INS), the apparatus comprising processing circuitry and at least one memory including computer program code, the at least one memory and the computer program code configured to, with the processing circuitry, cause the apparatus at least to:
   in conjunction with a turn made by a vehicle carrying the INS, determine a change between velocity vectors representative of a velocity of the vehicle at different respective points along the turn;
   determine centripetal acceleration experienced by the vehicle based upon the change between the velocity vectors;

determine a tangential velocity of the vehicle based upon the centripetal acceleration and a rotation rate of the vehicle;

based on the tangential velocity, correct a velocity estimate provided by the INS;

store sensor samples and filter states of the INS in a history buffer in associated with time values; and in combination with the tangential velocity determined in reliance upon the centripetal acceleration, backwards process the sensor samples and the filter states stored in the history buffer in a reverse chronological direction to propagate corrected filter states, thereby correcting a location estimate of the vehicle at one or more points in time prior to the turn made by the vehicle.

14. The apparatus according to claim 13, wherein the at least one memory and the computer program code are configured to, with the processing circuitry, cause the apparatus to determine the centripetal acceleration based also upon a time difference between points in time at which the vehicle is at the respective points along the turn.

15. The apparatus according to claim 13, wherein the at least one memory and the computer program code are configured to, with the processing circuitry, cause the apparatus to determine the tangential velocity based upon a magnitude of a ratio of the centripetal acceleration to the rotation rate of the vehicle.

16. The apparatus according to claim 13, wherein the at least one memory and the computer program code are further configured to, with the processing circuitry, cause the apparatus to determine an uncertainty estimate based upon the tangential velocity determined in reliance upon the centripetal acceleration and the rotation rate of the vehicle.

17. The apparatus according to claim 13, wherein the at least one memory and the computer program code are further configured to, with the processing circuitry, cause the apparatus to identify that the vehicle is making the turn in order to trigger determination of the change between velocity vectors.

* * * * *